Dec. 26, 1939. A. DO HUU CHAN 2,184,908
DEVICE FOR REGULATING THE TEMPERATURE OF METAL CYLINDERS
Filed March 29, 1937  2 Sheets-Sheet 2

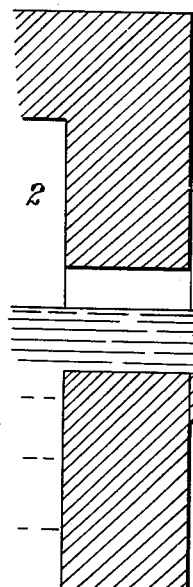
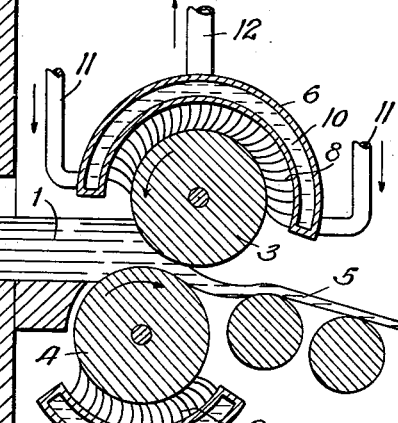
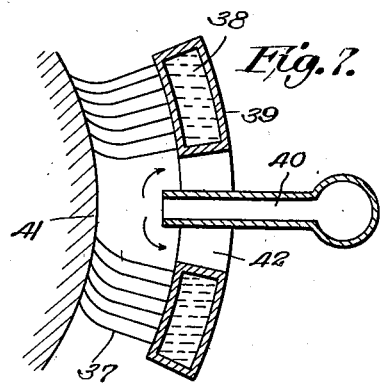
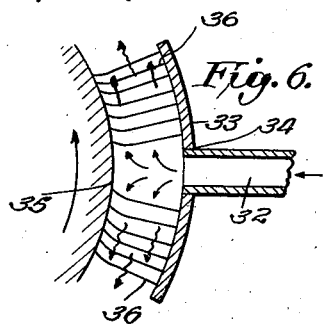
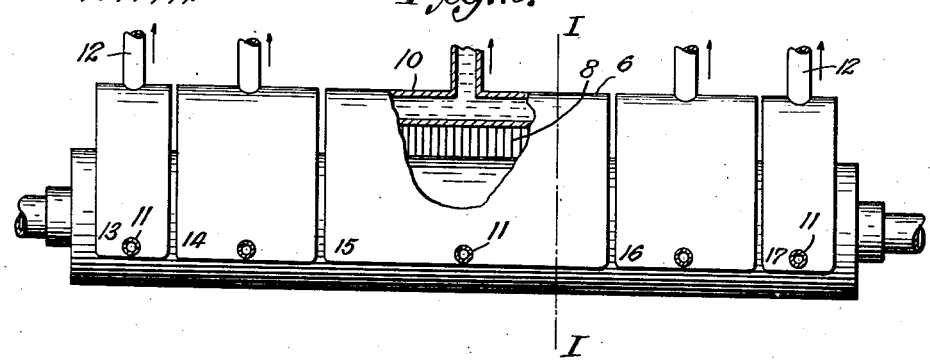
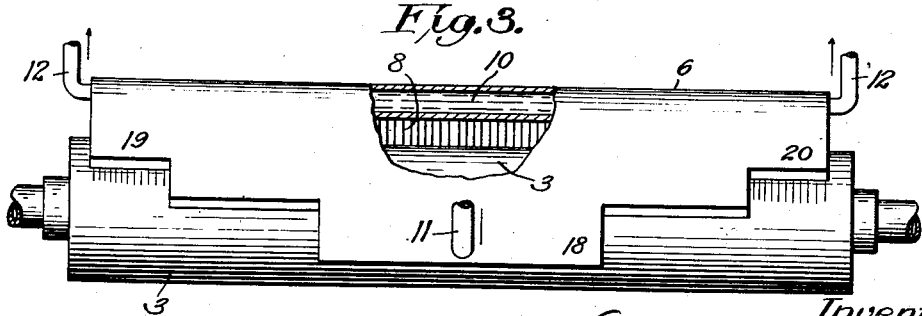

Inventor.
André Do Huu Chan
by Dailey Cole & Garner
Attorneys

Patented Dec. 26, 1939

2,184,908

UNITED STATES PATENT OFFICE 2,184,908

DEVICE FOR REGULATING THE TEMPERATURE OF METAL CYLINDERS

André Do Huu Chan, Sceaux, France, assignor to Societe Anonyme des Manufactures des Glaces & Produits Chimiques de Saint-Gobain, Chauny & Cirey, Ibis, France Application March 29, 1937, Serial No. 133,695
In France March 31, 1936

11 Claims. (Cl. 263—1)

In the industry of glass articles, a considerable use is made of rollers or cylinders, in particular metal cylinders. As a matter of fact, such cylinders are used in operations such as rolling or drawing, for conveying glass sheets in the plastic state and also for conveying all glass articles during the reheating and cooling treatments which they have to undergo.

In all these operations, the temperature of the external surface of the cylinders plays an important part because said surface is in contact with glass and its temperature therefore influences the temperature of said glass. Furthermore, the cylinders, when heated to an excessive temperature, become deformed or cause glass to stick thereto.

It is therefore necessary to be able to control the temperature of the cylinders, chiefly at their external surface. In order to maintain the cylinders at a suitable temperature, it is already known to establish a circulation of water on the inside of the roller, but this method involves many drawbacks: It is necessary that the cylinder should be hollow, that heat should be satisfactorily transmitted through the thickness of the metal, that the cylinder should be fluid tight, that water should fill the whole of the inside of the tube. Finally, this method is incomplete because it hardly permits of giving the cooling a different value from one part to the other of the cylinder.

In order to obviate these drawbacks, it was suggested to cool these cylinders by blowing air onto their external surface. But this method is very expensive. Furthermore, it gives rise to air displacements which, as a rule, cannot be permitted, either because cold air thus blown onto the cylinders mixes with the atmosphere in which the articles are immersed and interferes with the temperature thereof, or because it raises dust and brings it onto said articles.

As in the preceding case, it is still difficult, with this second method, to localize the cooling to strictly determined parts of the cylinder.

The object of the present invention is to obviate these drawbacks.

The essential feature of the present invention consists in regulating the temperature of the cylinder (or of any other element the temperature of which should be adjusted) by means of brushes or the like including metallic elements applied in an elastic manner against the surface of the cylinder and through which heat can be taken from the cylinder or supplied thereto as it is desired.

According to an embodiment, the metallic elements are constituted by hair-like wires the flexibility of which is utilized for obtaining a good contact of their ends with the surface of the cylinder. Owing to the small area of each of these elements and to the fact that each of them is kept individually in contact with the surface of the cylinder, the whole of the ends of these elements constitutes a surface which remains constantly in contact with the surface of the cylinder whatever be the deformations and the relief of this surface. In particular, when the surface of the cylinder is provided with ridges or engraved drawings, as in the case of printing cylinders, it is possible, by making use of these hair-like wires, to reach all the desired parts, as well in hollow as in relief.

According to a modification applicable to the case in which the surface of the cylinder in contact with the metallic elements is sufficiently smooth, I can, instead of hair-like elements, employ elements in the form of thin blades the flexibility of which is also utilized for obtaining a permanent contact of their end with the surface of the cylinder.

In other cases, it is even possible to obtain a sufficient contact by means of elements having each a section greater than hair-like elements or thin blades, and which, consequently, have a certain rigidity. These elements will be applied against the roller through any suitable means, either elastically or under the effect of their own weight.

Other features of the present invention will result from the following detailed description of some specific embodiments thereof.

Preferred embodiments of the present invention will be hereinafter described, with reference to the accompanying drawings, given merely by way of example, and in which:

Fig. 1 is a vertical section at right angles to the axes of the two rolling cylinders of a machine for the continuous manufacture of a glass plate or sheet;

Fig. 2 is an elevational view of the upper cylinder of the same machine, seen in front view;

Fig. 3 is a view analogous to Fig. 2, showing a modification of the device for regulating the temperature of a cylinder;

Figs. 6 and 7 are sectional views of other modifications according to the invention.

Figure 4:
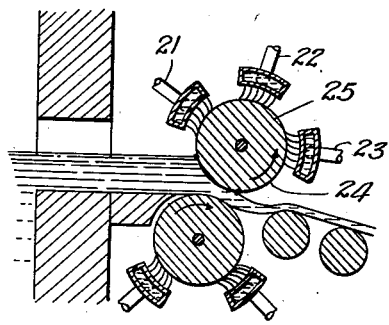
Figs. 4 and 5 are views similar to Fig. 1 and showing other arrangements of the parts.

In Fig. 1, reference numeral 1 designates the stream of glass issuing from a melting furnace 2 and rolled between cylinders 3 and 4 so as to form a sheet 5. According to the invention, rollers 3 and 4 are cooled by means of metallic brushes 6 and 7 which are of a cylindrical shape such that their surface corresponds to that of the cylinders, in some cases with a certain flexion of the hair-like elements. Owing to their elasticity, these elements are always in contact with the surface of the cylinder. On the other hand, owing to their fineness, they penetrate into the bottom of all the hollows, either accidental or not (such as ridges) that may exist in this surface. Thus, they ensure a perfect contact with the roller.

In order to evacuate the heat that the brushes receive from the cylinder, in the embodiment of Fig. 1 these brushes are hollow and a circulation of a cooling fluid 10 is provided. I have shown for the upper cylinder the cooling fluid inlet tubes at 11 and the outlet tube at 12.

In order to adjust the action of the brushes, various means may be employed. For instance, I may act upon the temperature of the fluid that circulates in the setting of the brush, upon the density of distribution of the metallic hair-like elements, upon their diameter, the nature of the metal of which they are made, and even their length, in such manner as to modify the amount of heat taken off from the cylinder by the cooling fluid per unit of area of the brush setting. Finally, I may act upon a greater or smaller portion of the circumferential periphery of the cylinder. Therefore different means are available for adjusting at will the cooling of the cylinder at the different points thereof. If it is desired to adjust the cooling of the central portion of the cylinder differently from that of the ends, which is often the case, because rolling cylinders generally heat up to a higher degree in the central part than at the ends, I may make use of a device such as that shown by Fig. 2. In this figure, I have shown a brush made of five independent elements 13, 14, 15, 16, 17, each constituted in the manner shown by Fig. 1. In each of the boxes formed by these elements, I can circulate a fluid of different temperature, for instance a fluid which is cooler in the central box 15 than in the end boxes 13 and 17. Furthermore, the hair-like elements may have a greater density of distribution in the central element or their conductivity may be higher.

In Fig. 3, I have shown a brush made of a single element 6, the shape of which is such that it covers a greater portion of the area of the cylinder, in the central portion 18 thereof than at the ends 19 and 20. With a common water circulation and a uniform density per unit of area of the brush, I obtain, with this device, a cooling which is less intensive at the ends than at the center.

Fig. 4 shows brushes consisting of segments 21, 22, 23, etc. which are, along the circumference of the cylinder, separated from one another in such manner as to be able, for instance, to graduate the cooling of every generatrix of the roller or cylinder as it is moving from point 24, where its contact with glass ceases, to point 25, from which the generatric is again brought into contact with glass.

Figure 5:
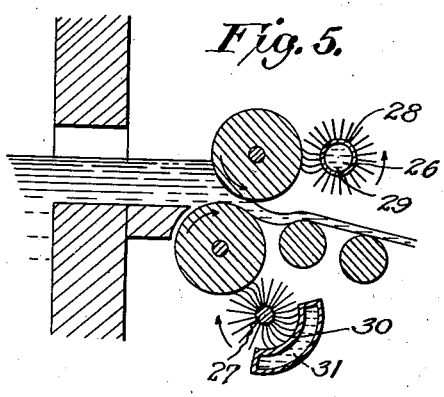

Fig. 5 relates to modifications in the arrangement and the operation of the brushes. Whereas, in the preceding embodiments, the brushes are stationary, those indicated by Fig. 5 are given displacements, for instance a rotary movement. For this purpose, the brushes are rotary and turn about axes such as 26 and 27. With such an arrangement, I increase at will the speed of displacement of the hair-like parts with respect to the cylinder without having to modify the speed of revolution of said cylinder. For this purpose, the rotation of the brushes is preferably in a direction opposed to that of the cylinder. In this embodiment, the hair-like parts that are in service are continuously renewed and can be brought to a very low temperature at the time they come into contact with the cylinder. In order to take off the heat that the hair-like parts have taken from the cylinder, I may, either have a circulation of fluid in the cylindrical setting or frame of the brush, or cause the hair-like parts to pass in contact with auxiliary surfaces themselves cooled down by a circulation of fluid. The first case is illustrated in Fig. 5 for the cooling of the upper cylinder. Setting 28 is hollow and a fluid 29 is caused to circulate therein. The second case is shown in the same figure for the cooling of the lower cylinder; in this case the setting of the brush does not play any part in the cooling. The heat taken by the hair-like parts is given off to a metallic case 30 on which the hair-like members are caused to rub and through which a fluid 31 is flowing.

In order to obtain, with one or the other of these two types of brushes, particular cooling effects for every point of the cylinder, I may vary the various factors above mentioned with reference to stationary brushes, such as the density of distribution of the hair-like parts, their conductivity, etc. Furthermore, I may act upon the size of casings 30 or the conditions of circulation or of temperature of the fluid that flows therethrough. I may also multiply the number of rotary brushes, in the portions that are to be cooled to a higher degree. Finally, the speed of revolution also plays a part in the transmission of heat and its influence can be taken advantage of.

On the other hand, I may, according to the present invention, obtain the thermic adjustment of the cylinder by combining the action of the hair-like parts with that of a fluid projected onto the surface of the cylinder. Figs. 6 and 7 relate to embodiments corresponding to this case. In Fig. 6, air is projected through a pipe 32, which extends through setting 33, the outflow of air taking place through orifice 34 so that said air impinges upon portion 35 of the cylinder and hair-like parts 36. If care is taken to provide hairs around orifice 34 in such manner that air can escape only by flowing therethrough, said air acts upon the cylinder in two different manners, to wit: first directly through its contact with portion 35 and also indirectly through its contact with the hair-like parts. In the example shown by Fig. 6, in which no circulation of liquid is provided in the brush frame, most of the cooling of the hair-like parts is obtained through the air blown through 34. In the example of Fig. 7, on the contrary, hair-like elements 37 are chiefly cooled by a water or gas circulation 38 provided in the brush frame 39. Air is projected through tube 40 onto portion 41 of the roller. An aperture 42 is provided in the brush frame so as to permit air blown from 40 to escape without passing through hair-like parts 37. The action of air is, in this second example, clearly separate from that of the brushes. Besides, said brushes prevent air from flowing outside of zone 41, which is an advantage if it is desired, for some reason, to exactly limit the action of said air.

Of course, I may, by combining analogous devices based on the same principle as Figs. 6 and 7, obtain a system in which the hair-like parts are cooled down both by air flowing through them and also by a liquid flowing through the brush frame or setting.

Under certain circumstances, it will be possible to dispense with any circulation of liquid or gaseous auxiliary fluid by producing the cooling of the hair-like parts through the mere cooling in the atmosphere of the brush setting or frame. For this purpose, the latter may be given a suitable shape, which has a large area of contact with the atmosphere, for instance by means of fins.

In some cases, the adjustment of the temperature of the cylinders consists not in cooling them more or less but in heating them. It is clear that all the devices above described are applicable to this last case. It suffices to replace the refrigerating fluid by a heating fluid, such for instance as steam.

I may also heat the frame or setting directly by means of a flame, such for instance as that of a gas burner. In this way, I may obtain a heating equivalent to the action of a flame coming into direct contact with the roller, without having the disadvantages that this direct contact of the flame would have for the good conservation of the surface of the cylinder.

Figure 8A:
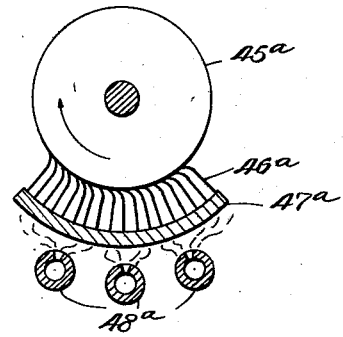
Figures 8a and 8b are views illustrating slightly different forms of transferring heat to a roll for the purpose of increasing its temperature.
Figure 8B:
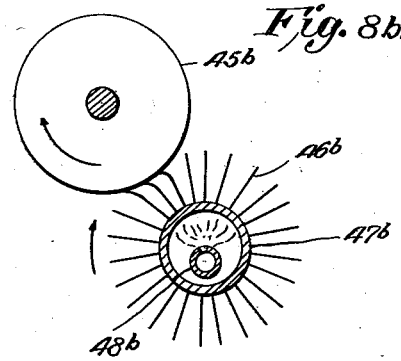

Figures 8a and 8b illustrate this principle. In the former figure the roll 45a is engaged by a plurality of metallic blades or wires 46a projecting from the frame 47a. The frame is heated by suitable burners 48a, the result being that the roll is heated by conduction. This construction is similar to that disclosed in connection with the lower roll of Figure 1 except that a heating medium is employed instead of a cooling medium. In Figure 8b the roll 45b is engaged by a plurality of metallic blades or wires 46b mounted for revolution on a sleeve or pipe 47b. The interior of this pipe is suitably heated by a burner 48b. The construction of Figure 8b is similar to the means for cooling the upper roll in Figure 5 except that a heating medium is substituted for the cooling medium.

Figure 9:
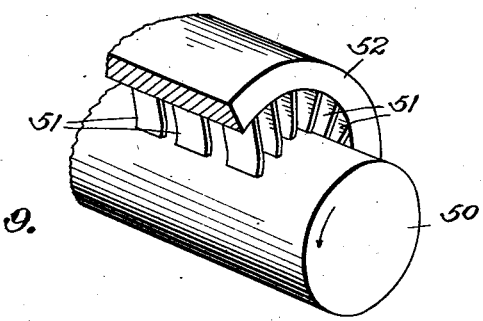

As above stated, I may, according to the circumstances, make use, instead of hair-like parts, of thin blades or more rigid elements. In all cases, it will be advantageous to make use, for the elements of the brush, of a metal which is a good conductor of heat, such as copper, and for the frame itself, when it serves to evacuate or to supply heat, a metal which is also a good conductor of heat. In Figure 9 there is disclosed a roll 50 which is engaged by a plurality of relatively thin metallic blades 51 carried by a suitable support 52.

In the various figures of the drawings, I have brushes acting upon the external surface of the rollers or cylinders. It is clear that the invention is also applicable to the cooling of the interior of hollow cylinders. It is also applicable to the thermal conditioning of the surface of members other than cylinders (for instance tables, inclined planes, etc.), whether these members are metallic, like the cylinders, or not. In particular, in the case in which it is desired to condition rollers or members of a material which is not a good conductor of heat, such as a refractory material or asbestos, the present invention ensures considerable advantages because it permits of acting in an efficacious manner on the very surface of the cylinders or members, that is to say without having to rely upon the conductivity of the material.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the accompanying claims.

What I claim is:

1. A device for regulating the temperature of members of the kind used in connection with the manufacture of glass, and especially cylinders, which comprises, in combination, a frame, and a multiplicity of heat-conductive elements mounted in said frame in such manner as to be resiliently applied against the surface of said cylinder, whereby an interchange of heat with said cylinder is performed through said elements.

2. A device for regulating the temperature of a cylinder of the kind used in connection with the manufacture of glass, which comprises, in combination, a frame, and a multiplicity of metallic hair-like parts mounted in said frame in such manner as to be resiliently applied against the surface of said cylinder, whereby an interchange of heat with said cylinder is performed through said hair-like parts.

3. A device for regulating the temperature of a cylinder of the kind used in connection with the manufacture of glass, which comprises, in combination, a frame, and a multiplicity of metallic thin blades mounted in said frame in such manner as to be elastically applied against the surface of said cylinder, whereby an interchange of heat with said cylinder is performed through said blades.

4. A device according to claim 1 in which said frame and said elements are mounted in a stationary manner so that said elements are permanently in contact with said cylinder, further including a fluid circulation system in said frame.

5. A device for regulating the temperature of a cylinder of the kind used in connection with the manufacture of glass, which comprises, in combination, a frame, a multiplicity of fine elastic metallic elements mounted in said frame so as to be elastically applied against the surface of said cylinder, whereby an interchange of heat with said cylinder is performed through said elements, said frame being rotatable and said elements forming a cylindrical brush about the axis of rotation of said frame.

6. A device according to claim 5 further including a box, arcuate in cross-section, means for circulating fluid in said box, said box being so shaped that said elements rub against its surface.

7. A device according to claim 1 further including means for directly heating said frame by means of a flame.

8. A device for regulating the temperature of a cylinder of the kind used in connection with the manufacture of glass, which comprises, in combination, at least two frames, a multiplicity of metallic fine elastic elements mounted in each of said frames so as to be elastically applied against the surface of said cylinder whereby an interchange of heat with said cylinder is performed through said elements, and means for independently regulating the respective temperatures of said frames.

9. A device for regulating the temperature of a cylinder of the kind used in connection with the manufacture of glass, which comprises, in combination, a frame, a multiplicity of metallic fine elastic elements mounted in said frame so as to be elastically applied against the surface of said cylinder, whereby an interchange of heat with said cylinder is performed through said elements, the number of elements per unit of length of said cylinder being variable over the length of said cylinder.

10. A device according to claim 9 in which the portion of the periphery of said cylinder along which said elements are applied against said cylinder varies along the length of said cylinder.

11. A device according to claim 8 in which said frames are disposed side by side, on a line parallel to the axis of said cylinder.

ANDRÉ DO HUU CHAN.